G. H. FRASER.
PUMP.
APPLICATION FILED FEB. 16, 1905.
989,775.
Patented Apr. 18, 1911.
3 SHEETS—SHEET 1.
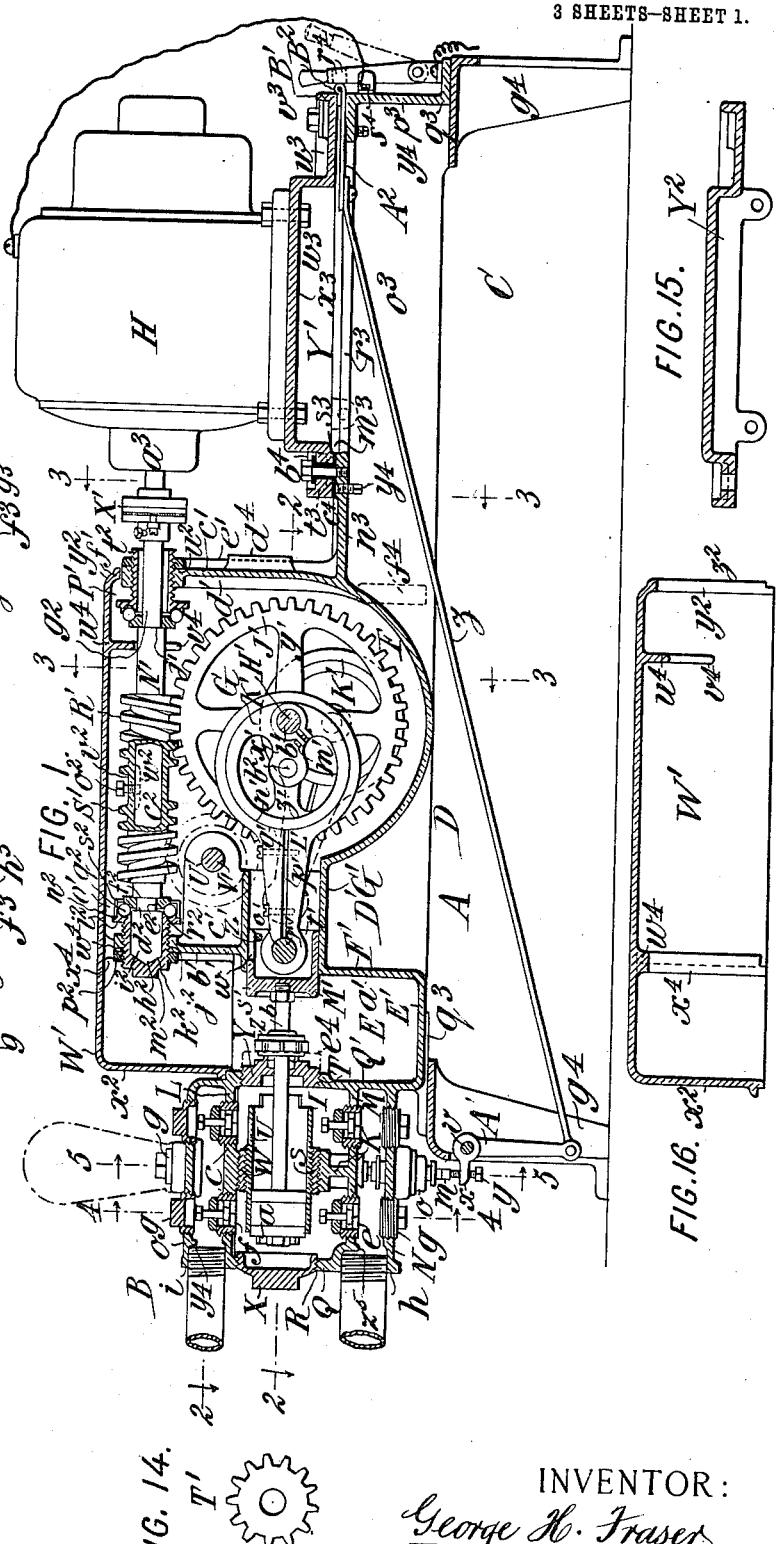
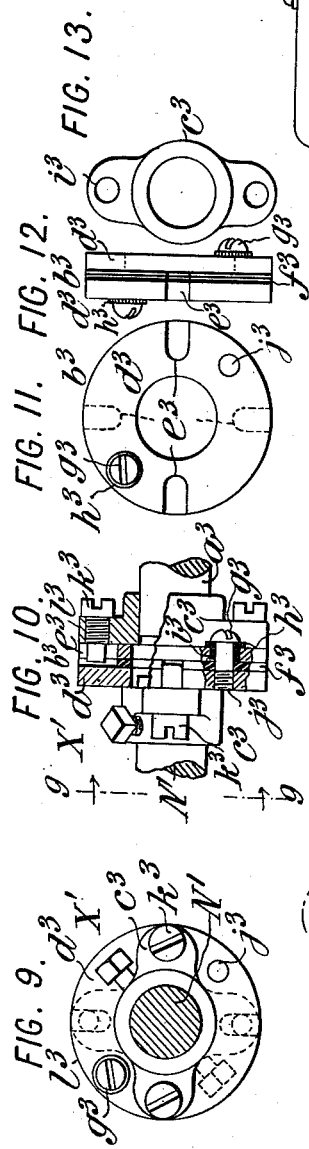
WITNESSES:
Fred White
René Muine
INVENTOR:
George H. Fraser,
By Attorneys,
Arthur E. Fraser G. H. FRASER.
PUMP.
APPLICATION FILED FEB. 16, 1905.
989,775.
Patented Apr. 18, 1911.
3 SHEETS—SHEET 2.
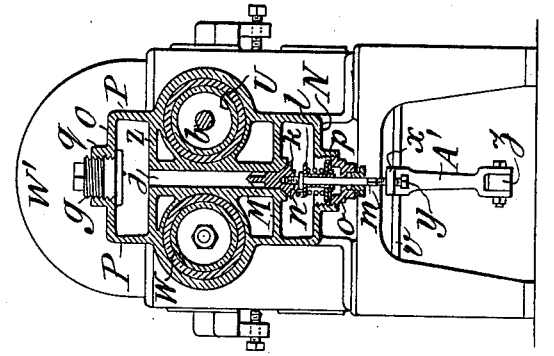
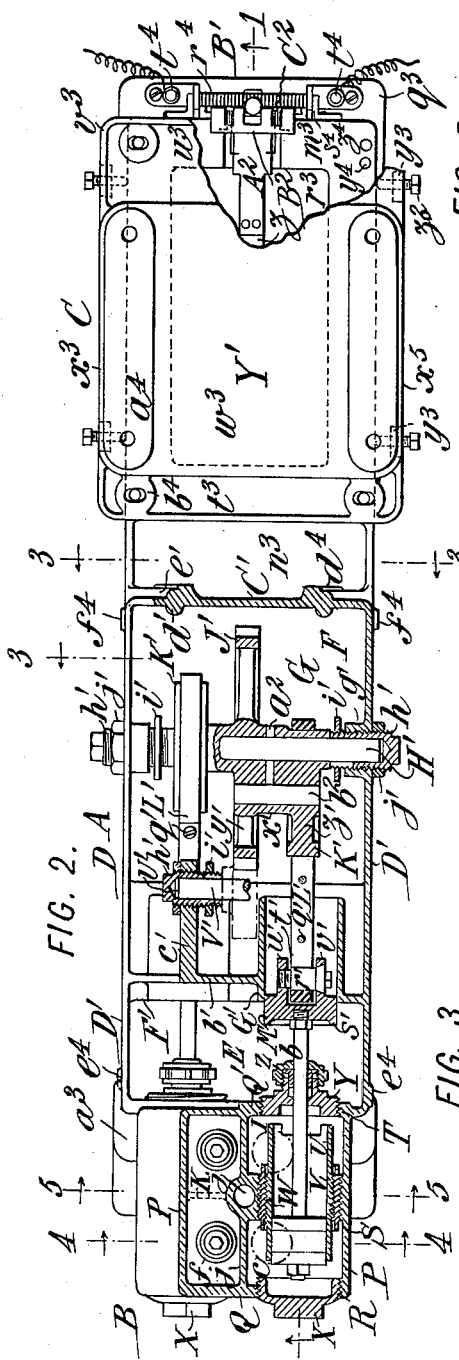
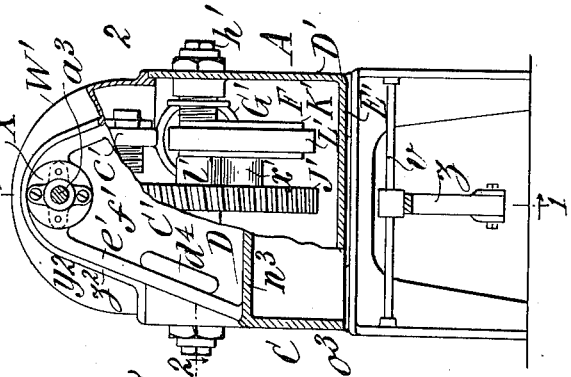
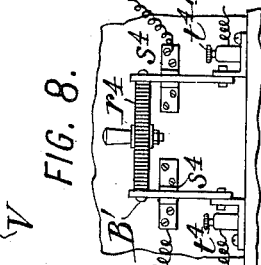
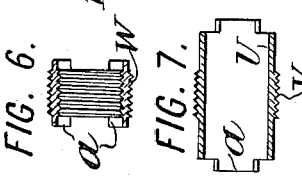
WITNESSES:
Fred White
René Bruine
INVENTOR:
George H. Fraser,
By Attorneys,
Arthur C. Fraser G. H. FRASER.
PUMP.
APPLICATION FILED FEB. 16, 1905.
989,775.
Patented Apr. 18, 1911.
3 SHEETS—SHEET 3.
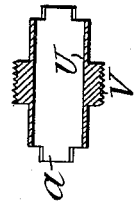
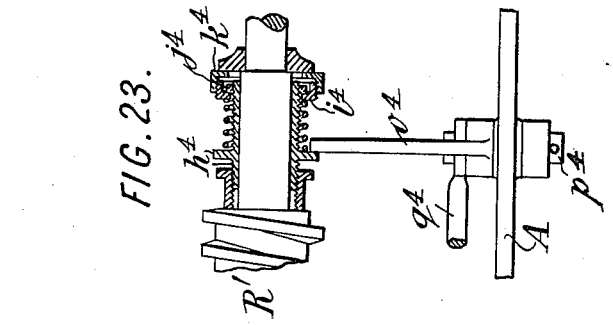
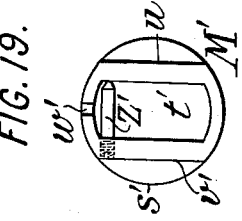
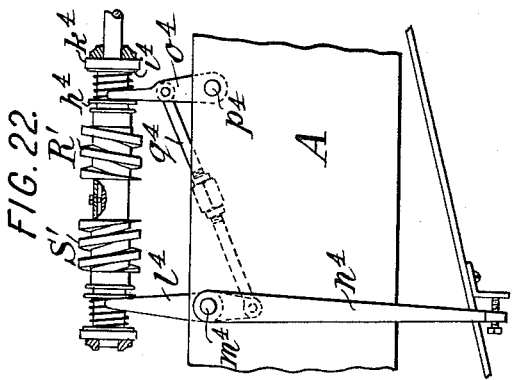
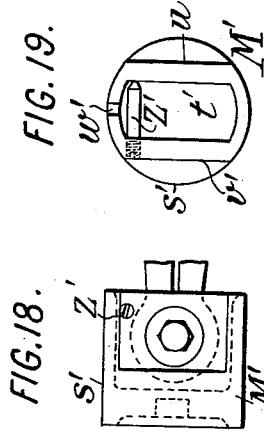
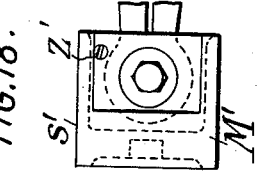
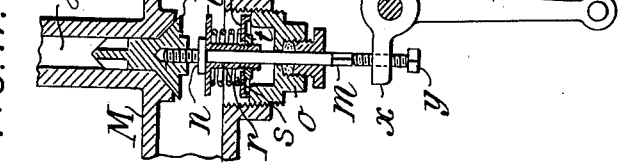
WITNESSES:
Fred White
René Bruine
INVENTOR:
George H. Fraser
By Attorneys,
Arthur C. Fraser & Co.

UNITED STATES PATENT OFFICE.

GEORGE H. FRASER, OF NEW YORK, N. Y.

PUMP.

989,775.  Specification of Letters Patent.  Patented Apr. 18, 1911.

Application filed February 16, 1905. Serial No. 245,885.

*To all whom it may concern:*

Be it known that I, GEORGE H. FRASER, a citizen of the United States, residing in the borough of Brooklyn, county of Kings, city and State of New York, have invented certain new and useful Improvements in Pumps, of which the following is a specification.

This invention relates to pumps of the reciprocating plunger type, and is especially applicable to power-driven pumps such as those operated by an electric motor.

The invention aims to provide various improvements in pumps, which improvements while in whole or in part useful in connection with various types of pumping devices, are in their preferred adaptation especially advantageous in electrically-driven pumps.

In carrying out the invention in its preferred form, an improved pump end and mechanism is provided, improved driving mechanism is provided, an improved receptacle for the latter mechanism is provided, and improved means for carrying the motor or other source of power and for connecting it to the driving mechanism are provided. Preferably the pump end, gear box and motor support, are formed in a single integral casting, and means are provided for preventing injury in case the pump is overloaded.

As applied to a duplex double-acting pump, in the preferred form of my invention I form in one casting the two pump cylinder chambers and their suction and discharge chambers, the cylinder chambers being bored through their front, center and rear walls to the size suited to receive the maximum diameter of cylinder for which the pump is designed, the ends of the cylinder chambers being closed by screw plugs, and the cylinders proper being formed by a lining which is screwed or otherwise fitted into the bore in the central wall if of maximum size, or into a bushing screwed into this bore if of less diameter than the maximum size; and I provide suction and discharge valve apertures in the top and bottom walls of the cylinder chambers, and corresponding apertures in the top and bottom walls of the discharge and suction chambers, in alinement each with the others, so that all may be drilled and tapped at one operation before insertion of the cylinder proper, the valves being screwed into their apertures, and plugs being screwed into the other apertures to close the pump casing; and I provide a by-pass between the discharge and suction chambers, and a pressure operated valve opening at a predetermined pressure to establish communication between these chambers and relieve the pump in case the discharge pipe is closed or pressure exceeds that against which the pump should work; and I provide an automatic safety device for cutting out the source of driving power, which device is operated by the pressure against which the pump is working, preferably through the operation of the relief valve; and I cast on the end of the cylinder casing a box or receptacle, preferably subdivided into two compartments, the one adjacent to the cylinders constituting a water receptacle for gathering leakage and a chamber for the stuffing boxes of the pump, and the other separated from the first and constituting an oil chamber in which the eccentric cranks and driving mechanism are contained; and between the water and oil chambers I provide in the one casting slideways for the pitman cross-heads, which ways are bored in alinement with and preferably of the same diameter as the borings of their respective cylinder chambers, and are cylindrical and closed by cylindrical cross-heads preventing communication between the compartments; and I provide improved anti-friction and lost motion bearings for the driving mechanism, improved means for adjusting wear and increasing the bearing surface or reducing end thrust, and an improved insulated compensating joint for any minor difference in alinement between the worm-shaft and the motor shaft; and I provide on the end of the box opposite the pump end an extension and interchangeable motor carriers, whereby the one casting can be utilized for carrying any kind of motor within predetermined limits by mere substitution of motor pans to get the proper elevation and connecting points, and the requisite drip pan area for the particular motor to be used.

In the accompanying drawings which illustrate the preferred form of my invention as applied to an electrically-driven water pump, Figure 1 is a vertical longitudinal section partly in side elevation cut partly on the planes of the lines 1—1 in Figs. 2 and 3, showing my improved pump; Fig. 2 is a plan view thereof partly in horizontal section on the planes of the lines 2—2 in Figs. 1 and 3, the motor being omitted; Fig. 3 is a vertical cross-section thereof cut on the lines 3—3 in Figs. 1 and 2, and looking in the direction of the arrow; Fig. 4 is a vertical cross-section thereof cut on the lines 4—4 in Figs. 1 and 2, and looking in the direction of the arrow; Fig. 5 is a vertical cross-section thereof cut on the lines 5—5 of Figs. 1 and 2 and looking in the direction of the arrow; Fig. 6 is an axial section of the bushing for the smallest cylinder lining; Fig. 7 is an axial section of the largest cylinder lining; Fig. 8 is a fragmentary end elevation showing the switch; Fig. 9 is an enlarged cross-section of the worm-shaft showing the compensating joint in end elevation looking in the direction of the arrow on the line 9—9 in Fig. 10; Fig. 10 is a fragmentary side elevation partly in axial section of the compensating joint; Fig. 11 is a side elevation of the central member of the joint; Fig. 12 is an edge view thereof; Fig. 13 is an end view of one of the members of this joint; and Fig. 14 is a side elevation of the auxiliary gear. Fig. 15 is a side elevation of a substitute motor carrier for use with a motor having greater height than that shown in Fig. 1; Fig. 16 is a section of the cover alone; Fig. 17 is a fragmentary sectional view on a larger scale of the relief valve; Fig. 18 is a side elevation of one of the slides; Fig. 19 is a front view thereof; Fig. 20 is a fragmentary plan of the quick-acting safety switch operator in the open position; Fig. 21 shows a cylinder lining in which the enlarged central part is of sufficient diameter to avoid the use of a bushing, while the bore of the lining is small enough to answer for a small capacity; and Fig. 22 is a fragmentary view of the safety operating device applied to the worm gear; Fig. 23 is an enlarged detail thereof.

Referring to the drawings, I will now describe in detail the preferred form of my invention.

Let A indicate the body of my improved pump, B the pump end, C the power end, D the intermediate box, E the drain chamber, F the oil well and gear chamber, G the driving mechanism, and H the motor.

The body A is preferably a single casting in which the pump end, drain and oil compartments, and the driving end, are formed.

The pump end B has adjacent cylinder chambers I separated by the usual longitudinal wall J and transverse wall K, and closed at top by the bottom wall L of the discharge chamber, and at bottom by the top wall M of the suction chamber. The bottom wall N of the suction chamber and the top wall O of the discharge chamber, connect with the side walls P of the pump, and with the outer wall Q and inner wall Q' constitute a complete pump end casting. The cross wall K is flanged or formed of suitable width near the cylinder, and concentric with the axis of each cylinder holes R S and T are bored through the outer wall, cross wall and inner wall of the pump end for each cylinder, these holes being preferably of like diameter so as to be bored at one operation. These holes are then tapped with a screw thread, the tap being run through the three holes at one operation. The bore and tap are large enough to receive the maximum diameter of cylinder. A cylinder U is provided having the internal diameter desired for the work for which the motor with which the pump is to be equipped is designed. This for example may vary from a two-inch minimum diameter to a four-inch maximum diameter. The cylinder U has an external screwthread V on its central portion, and the diameter of one or both its extremities is not greater than the depth of this screwthread. If the cylinder is of maximum diameter, this screwthread screws directly into the thread in the cross wall K, whereby the cylinder is held in place; but if the cylinder is of the minimum or an intermediate diameter, its screwthread screws into a bushing W which has an internal thread to fit its intermediate size of cylinder, and an external thread fitting the thread of the cross wall K. The bushings are removable and will be substituted for one another as cylinder requirements vary, and the cylinders are likewise removable, both being provided with provisions, as the lugs a for example, by which a screwdriver or wrench engagement can be made with them for screwing them into or out of the pump end. The outer end of the cylinder chamber is closed by a plug X, which may be tapered, so it can be screwed tight, and the inner end is closed by a plug Y, likewise tapered, which is provided with the usual back packing provisions Z for making a tight joint around the piston rod b.

Valve holes c c are drilled vertically through the four walls of the pump end at equidistant points from the center, one for each cylinder chamber I, the holes being all of the same diameter and all tapped alike, so that for each set of valves d d there is a vertical series of holes c in alinement. The suction valve plugs e are screwed into the wall M, and the discharge valve plugs f are screwed into the wall L. The holes below and above these valves are then closed by taper plugs g. The drilling and tapping and inserting of valve plugs is accomplished before the cylinders U are inserted, and the holes c are spaced sufficiently to permit the drill and tap to clear the flange on the wall K. A suction inlet h and a discharge outlet i are provided at the outer end of the suction and discharge chambers respectively. At a suitable point, preferably centrally of the valves, a passage j from the discharge to the suction chamber is provided. This is closed by a valve k held to its seat by a yielding member as the spring cage l, so that it will only open at a predetermined excess of pressure in the discharge chamber. An adjustable stem m screws into the valve k and has a shoulder n supporting the valve from the spring cage l. The outer end of the stem has wrench or other provisions by which it can be turned to adjust the stem, and this end passes through a stuffing box in a plug o screwed into a threaded hole p in the bottom wall N. A similar hole q is provided in the top wall O and closed by a plug g, except when an air chamber is screwed to the discharge chamber, as shown in dotted lines in Fig. 1.

The spring cage shown consists of a tubular flanged member r around which the spring s is compressed to the desired adjustment by a nut t, the spring resting on a ring u which is supported on the plug o, so that in case the pressure against the valve exceeds the resistance of the spring, the latter can yield, its tubular portion sliding through the ring u. The plug o will be screwed into its hole until a tight joint is made, and then the stem m will be screwed out of the valve k until the valve is tightly seated, the shoulder of the stem acting against the cage to hold the valve up. The initial compression of the spring will be say equivalent to 100 pounds pressure per square inch, and the valve will be set so that it will not open until the pressure in the discharge chamber exceeds this, whereupon it will open and relieve excess pressure. The intermittent opening and closing of the valve under such circumstances will ordinarily make noise sufficient to indicate that there is a wrong condition existing, such for example as that the discharge pipe valve is closed and that the pump is working under an overload, so that the user may investigate and remedy the trouble, which otherwise might result in impairment of the driving mechanism.

In pumps of this character, especially those driven by worm gears, it is important to prevent operation under excessive load, and to do this my invention provides an automatic cut-out which will operate to disconnect the source of power when the load becomes too great. This may be variously applied, and may be operated from any point where the overload can be effectively utilized, as for example at any part of the driving mechanism, but I prefer to utilize the motion of the relief valve for operating this, and in an electrically-driven power-pump to provide a snap-switch operating device which will cut out the electrical connection for the motor as soon as the pressure exceeds a predetermined limit. To this end I provide a lever or other device A', which is tilted by the operation of the relief valve and operates a quick-acting switch B', which latter will be hereinafter described in detail. The device A' is preferably a lever fulcrumed on a pintle v, and having a short arm x provided with a screw y which is adjusted against the spindle m after the latter has been adjusted to properly set the valve, the other end of the lever being connected by a rod z with the cut-out.

The box D of the body is composed of end walls Q' and C', side walls D' D', bottom wall E', and a transverse partition F' which separates the drain chamber E and gear chamber F. The bottom wall E' is of irregular contour, that beneath the gear chamber being curved, and that beneath the drain chamber being flat, and the intervening partition is formed with tubular slideways G' extending from the drainage chamber to the gear chamber in line with the axes of the cylinders respectively, which slideways are preferably bored of the same diameter as and at the same time with the holes R, S, T in the cylinder casing. The lower part of the partition F' is a vertical wall a' above which the partition is nearer the gear chamber and rises in a narrow projection b' above the side walls. Above each slideway G' the partition is formed with a longitudinal vertical wall e' extending from the outer end of the slideway back through the gear chamber to the wall b' and reinforcing the latter. The wall C' of the box has vertical internal ribs d' and inclined external ribs e', and rises as a narrow projection or bearing portion f' above the side walls of the box. Through the side walls of the box holes g' are drilled and tapped, into which are screwed bearing sleeves h' which are closed at their outer ends and split at their inner ends, so that these ends can be compressed by tapered nuts i' screwing thereon. The bearing sleeves h' are adjustable in the walls, and are locked in position by jam nuts j'. The crank shaft H' and the driving gear is carried in the sockets of the bushings h', and may revolve therein or not as desired.

The driving gear consists of a worm gear J' and cranks K' driven thereby, which are preferably quartered in their relation to each other. The cranks are preferably the eccentric type of crank, and cast integrally with the worm gear. The worm gear is bored to fit the shaft H', and is preferably split on its hubs l', so that it can be clamped more or less tightly on the shaft by setscrews m', to take up slack and avoid lost motion. These screws may be used to clamp the shaft and gear non-rotatively together, so that the shaft will revolve in the bushings, and the screws i' on the bushings can compress the ends of the latter sufficiently against the shaft to avoid lost motion or take up wear. The bushings abut against the end of the hub of the gear, and can be adjusted to bring the gear and eccentrics in proper position axially and then locked in place. A pitman L' slips over each eccentric, and is connected to a corresponding cross-head M' screwed on one of the piston rods. Each pitman L' is preferably split between its bores n' and o', as shown at p', so that it can be clamped as by screws q' more or less snugly around the eccentric or the cross-head pin r', to take up wear or avoid lost motion.

The cross-head M' has a cylindrical end s' fitting the slideway at the pump side, and a socketed end t' receiving the end of the pitman. This end of the cross-head is drilled and tapped at one wall u', and has a tapered hole at the other wall v', and the pin r' has a threaded end screwing into the wall u' and a tapered head fitting the wall v', so that the pin can be screwed in until all lost motion is taken up. The cylindrical end of the cross-head is drilled and tapped so that it can be screwed on the end of the piston rod, and its other end is provided with flat vertical walls u' v', between which and its top and bottom walls it is formed with a socket t' opening toward the oil chamber, so that oil can splash into the socket for lubricating the pin r'. When the cross-head moves toward the pump end it almost clears the slideway, so that the end of the latter opening into the oil chamber may receive oil from this chamber. In its other extreme movement the cross-head passes slightly beyond the slideway, which serves to force out any foreign substance that may have entered the latter. In this way the slideway is kept lubricated and cleaned.

The gear J' and cranks K' are preferably formed as an integral casting, cored out for lightness, and shaped to space the cranks apart sufficiently to bring them in line with the axes of the cylinders, while the gear is equidistant from and intermediate of these axes. The gear is shown as a spoke wheel, and the cranks as eccentrics of sufficient diameter to surround the bore of the gear. The hub l' of the gear is formed with an enlargement or web $x'$ coinciding with the center of each eccentric, and extending from the adjacent spoke $y'$ of the gear to a central spoke $z'$ in the eccentric, which web is drilled centrally of the eccentric and terminates before meeting the opposite eccentric. Thus the gear has three parallel bores, one corresponding with its center, and one corresponding with each eccentric center, so that when the gear has been bored and turned up it can be centered on first one eccentric center for turning that eccentric, and then on the other eccentric center for turning that eccentric, and can be clamped against the lathe through the bore for the eccentric in each case. The hub of the gear is cross bored at $a^2$ between each eccentric and the gear with a small bore meeting the bore $b^2$ of the eccentric, so that as the latter dips in the oil in revolving, the oil it lifts as it rises can flow through the cross bore on to the crank shaft, thus insuring lubrication in case the gear is allowed to run on the shaft. The hole $a^2$ is tapped so that if desired a setscrew can be applied here in case the gear and shaft are to rotate together.

A worm shaft N' is preferably used for driving the gear when an electric motor is the source of power, as thereby the high speed of the motor can be most conveniently reduced and a continuous action on the gear obtained. To carry this shaft I provide bearings O' P' at opposite sides of the gear J'. The bearing O' is preferably carried or formed in the projection b', and the bearing P' in the projection f', and each bearing is preferably adjustable both to take up lost motion and to shift the worm shaft axially relatively to the gear J', so that it can be advanced one or more teeth either way to take up wear or for other reason. Any suitable bearings for the shaft N' may be used, but owing to its high speed and the great end thrust, I prefer to provide ball or roller bearings for it. As shown, the shaft N' is formed with a cylindrical portion $c^2$ having a short reduced portion $d^2$ on which is mounted a cone $e^2$ which seats against a shoulder $f^2$, and is removably held on the shaft at the pump end, and with a long reduced portion $g^2$ on which is mounted a second cone which seats against a shoulder $f^2$ at the motor end; and the bearing O' is formed with a hollow member $h^2$ on the inner end of which a concave track $i^2$ is formed, which member has an external screwthread screwing into the screwthreaded hole $j^2$ in the projection b', a closed end $k^2$ at the outer side of said projection, a central socket $l^2$ opposite the end of the shaft, and wrench faces or provisions $m^2$ on its outer end and $n^2$ near its inner end by which the member can be adjusted. A jam-nut $p^2$ screwing on the member locks it in place. Rollers or balls $q^2$ run between the cone $e^2$ and the concave $i^2$. A lip $r^2$ within the concave, and a hood $s^2$ frictionally held around it, constitute together a ball retainer for preventing loss of the balls. The bearing P' is identical in construction except that its member $t^2$ is open at its outer end, so that the end $g^2$ of the shaft N' may project through and beyond it. In other respects it has the same parts as the member $h^2$ of the bearing O'. It screws through a threaded hole $u^2$ in the projection $f'$ and is adjustable therein as described for the other bearing.

A worm R' is formed on or carried by the shaft N'. Preferably it is a separate member carried on the shaft so as to be driven thereby, and constructed to be adjustably thereon, so that it can be moved to successive positions to present successive portions as the portion being used becomes worn. To this end it is much longer than necessary, and is fastened to the shaft by a set-screw $o^2$ screwing through the sleeve $v^2$ of the worm and setting in a groove $w^2$ on the shaft.

In order to provide for an auxiliary gear where end thrust is to be reduced, I prefer to provide the worm R' with an auxiliary reverse portion S' formed integrally with it, and so disposed that it may be used to mesh with an auxiliary gear, which in turn will mesh with the gear J', and I provide such an auxiliary gear T' and bearings U' therefor, which are mounted in the vertical walls $c'$, so that the auxiliary worm can at any time be introduced by the user by simply putting it in position between these bearings, inserting its shaft V' and adjusting the bearings. The bearings U' are identical in construction with and bear the same reference letters as, the bearings for the crank shaft H'. In this way the driving mechanism can always be adapted to carry an extraordinary load, as the reverse worms meshing with the reverse worm gears, which latter are meshing together, will double the wearing surface carrying the driving thrusts. It will rarely be necessary to take advantage of this provision, however, as my invention provides the gear J' of such relatively great diameter in proportion to the crank throw, that the thrust at the teeth is relatively small. The auxiliary gear T' is of much less diameter than the main gear, and its axis is above the slideways, so that it does not interfere with the slides and does not necessarily increase the length of the pump, and also is high enough to be easily accessible. The bore of its bearings is above the top edge of the side walls, so that it can be drilled and tapped and the bearings removed and replaced without inconvenience. It will be understood that as the direction of drive is immaterial, there is no disadvantage in having part of the worm reverse in pitch to the other part, as it will only be necessary to remove the worm from the shaft and reverse it in order to bring the other end into use in case the end first used wears out. For removing the worm in the construction shown, the bearing O' will be screwed back sufficiently to permit the end of the worm shaft to be tilted up until the worms clear the bearing as the shaft is drawn out of the other bearing. When the shaft is replaced, the bearing O' will be properly adjusted again and then locked.

I provide a cover W' for the box, which is high enough to rise from the relatively low side walls over and inclose the mechanism, and has a vertical wall $x^2$ extending straight across its lower edge at the pump end, and a vertical wall $y^2$ at its other end having a notch $z^2$ fitting the outline of the projection $f'$, so that the cover can only be put on in proper position. To prevent oil being thrown through the tubular bearing P', I provide the cover with a transverse partition $u^4$ which has a notch $v^4$ straddling the shaft N' in advance of this bearing. The cover also has a transverse partition $w^4$ near the pump end which has a notch $x^4$ fitting the projection carrying the bearing O', to prevent water splashing into the oil chamber or oil splashing into the water chamber, thus completely isolating these two chambers.

The difficulty of exactly centering the shaft $a^3$ of the motor H with the worm shaft N', is avoided by my improved compensating coupling X', which is preferably formed of a floating member $b^3$ loosely mounted between two identical shaft members $c^3$ $c^3$ set on the adjacent ends of the motor and worm shafts. In its preferred form this coupling consists of two metal disks $d^3$ having diametrically opposite notches $e^3$, which disks are clamped together against the opposite sides of a disk of insulating material $f^3$ by means of screws $g^3$ which pass through an insulated washer and collar $h^3$ in the large hole $i^3$ in one disk, and screw into a smaller threaded hole $j^3$ in the other disk, each disk being formed with one large hole and one small threaded hole, so that when two disks are put together with their notches 90 degrees apart, these holes will match. The insulation is notched opposite the disk notches, and the shaft members $c^3$ carry pins which project into diametrically opposite notches of one disk far enough to make a driving connection, but not far enough to traverse the insulation and make contact with the other disk. These pins are preferably the reduced ends of screws $k^3$ which screw into holes $l^3$ in the arms of these members, all as clearly shown in Figs. 9 and 13. This provides a strong insulated coupling in which the rotative drive is effected while permitting a certain amount of axial motion to compensate for imperfect alinement of the shafts, as the floating member can slide radially relatively to either shaft without cramping it, according to well known principles.

The motor varies in dimensions according to size or style, and to adapt the body for carrying any motor within predetermined ranges of dimensions, I construct the support C with a bearing face $m^3$ sufficiently low to permit interposition of a separate motor carrier or riser Y' between any motor of the class intended to be used with the pump and such face of the body, and I provide a plurality of risers all adapted to fit the base, and each adapted in height and shape to its particular type or size of motor, so that, knowing the motor to be used, it is only necessary to apply the corresponding motor carrier to the body. The power end C of the body is constructed as a rectangular projection from the box D, having points or faces for receiving the motor carrier, a horizontal portion $n^3$, upwardly extending sides $o^3$ and end $p^3$, and a projecting flange or leg rest $q^3$, the wall $n^3$ being open at $r^3$ beneath the motor carrier. The motor carrier is a combined drip-pan and riser and projects the necessary amount to receive drippings from the motor, as well as extending high enough to give the motor shaft the necessary elevation for coinciding with the worm shaft. The carrier Y' has feet $s^3$, inner and outer pans $t^3$ $u^3$ surrounded by a flange $v^3$, an intermediate raised top wall $w^3$, side wall $x^3$, and screwthreaded projection portions $y^3$, which latter overhang the sides of the body and are traversed by adjusting screws $z^3$, by which the riser can be adjusted laterally of the body near its four corners. The top wall $w^3$ is provided with motor attaching provisions, as for example bolt holes $a^4$ by means of which the motor may be bolted to the riser, and the lower part of the motor carrier is provided with attaching provisions, as for example the elongated or enlarged holes $b^4$ by which it can be attached to the body of the pump by screws or bolts or otherwise. Insulation $c^4$ is preferably provided between the motor carrier and the body of the pump.

The body A may be planed on its leg carrying flanges $q^3$, on the bottom, on its faces $m^3$, at the power end, on projections $d^4$ on the end wall of the box, on the outer face of the wall Q, and on side projections $e^4$ and $f^4$, so as to give bearing points on all sides against which it may be clamped while boring and drilling. The legs $q^4$ may be clamped to the bottom of the body if used.

The safety device for cutting out the current in case of overload is for simplicity in Fig. 1 shown only as applied to the pressure-operated valve, but where the safety provision is to include cutting out in case the overload is due to binding in the driving gear, or to the stuffing boxes or pistons being packed too tight, the automatic cut-out will also be worked from the driving gear, or it will be worked from that alone. In such case the worm is the most convenient element to use for operating it, and this will be done preferably as shown in Fig. 22, in which the worm is feathered on the worm shaft so that it can slide if the pressure on it is sufficient to compress the spring cage at either end, which is adjusted to transmit its end thrust to the cone bearing. These spring cages are similar to that described with reference to the relief valve. Each consists of a thimble $h^4$ bearing against the worm and carrying a spring which is compressed between the head of the thimble and a washer $i^4$, by a nut $j^4$ screwing on the thimble, which may be set at a compression of say 100 pounds. The thimble slips over the end of the shaft, but is not as long as the distance between the end of the worm and the wall of the bearing cone. Between the washer $i^4$ and this cone, a sleeve $k^4$ screwing on to the ring is adjusted so as to exactly take up the remaining distance between the ring and the bearing. This is done at each end so that the worm is held against axial displacement until a predetermined force is applied to it axially, in which case it will move one or the other thimble as it compresses the spring when the force exceeds the predetermined limit. In the path of one thimble is a lever $l^4$ fulcrumed at $m^4$ and having a long arm $n^4$ extending downwardly, and in the path of the other thimble is a lever $o^4$ fulcrumed at $p^4$ and connected by a link $q^4$ to the lever $l^4$ below its fulcrum. The levers are so disposed that if either is moved by the compression of the adjacent spring, the lever $n^4$ will be tilted to operate the safety cut-out, and the springs are adjusted to yield under excessive strain and permit the levers to be tilted, thus stopping the operation of the pump. This arrangement of safety operating device in the driving gear will be used in preference to the relief valve operation of the cut-out when only one worm and gear are utilized. The other will be used in preference to this when two intermeshing gears with reverse worms are utilized, or in the latter case both may be used by adapting the operating mechanism for the safety device to be operated by reverse worms.

The cut-out preferably consists of a snap-switch B' operated by a sliding plate $A^2$ and swinging member $B^2$. The plate $A^2$ is connected by a rod $z$ with one or both of the automatically operated safety devices, so as to move the plate against the switch and disengage it when the pressure or load increases too much. As shown in Fig. 1 the rod $z$ extends from the lower end of the lever A' upwardly under the pump to the plate $A^2$. This plate is a sliding member resting on the top face of the body and between it and the motor carrier Y'. On the outer end of the plate is hinged the plate $B^2$, a spring $C^2$ between them tending to swing the plate $B^2$ upwardly and outwardly, which tendency is resisted by the fact that the plate B² slides under the motor carrier. The insulated cross bar $r^4$ of the switch B' is in the path of the plate B², and is moved out when the latter is moved outwardly. The instant the plate B² is moved far enough to clear the edge of the carrier Y', the spring quickly throws the plate over, so that it knocks the switch completely out from connection with the contacts $s^4$. The motor connections run from these contacts up to the motor, and the line connections run from the binding posts $t^4$ outwardly. The plate B² is colored or labeled to indicate danger, and its outward position will serve to indicate the cause for automatic cutting out, which can be remedied before restarting the pump. To restart, the plate will be folded back on the bar and again pushed under the carrier Y', whereupon the switch can be closed by hand.

In operation, the pump will be operated like any ordinary crank-driven pump, will automatically relieve itself against excess discharge pressure by the relief valve, and will automatically cut out in case of overload. The driving gear will run in a bath of oil, which being isolated from the water leakage at the pump end, will not be impaired by the presence of water, and will not be overflowed by such leakage. The worms will be adjusted a short distance by adjusting the bearings in their screw-threaded sockets, or a long distance by adjusting the worm on the worm shaft or by reversing the worm. Excessive work will be provided for by introducing the small auxiliary gear. All slack will be taken up by the described adjustment, so that the pump will operate with the minimum of noise.

In manufacture, the same bodies and driving gear will be provided for the various capacities for which the pump is designed, and the cylinders and pistons suited to the particular work required in each instance will be introduced when this is known. It will be possible for a customer to increase the pump capacity by simply changing cylinders and pistons, and substituting motors if necessary.

For convenience in referring to my improvements, I will refer to the pump end of my improved device as the rear end, and to the power end thereof as the front end of the pump. I will use the term "eccentric" in its broad sense as converging any crank or other provision which is eccentric to the axis about which it revolves, and the term "gear" as signifying a worm gear or other toothed gear.

It will be understood that when the gear J' is intended to be used in conjunction with the reverse gear U', the teeth of these gears will be rack teeth, so that they will intermesh, and the worms will be correspondingly toothed, but that when use of the auxiliary gear is not provided for, the gear J' may have the usual concave or hobbed teeth, and the worm corresponding teeth.

Where there may be danger of injury to the pump from freezing, I construct all or the necessary number of its internal vertical walls with an upwardly diverging taper, and the drainage chamber with a similar taper, so that if ice forms it may force itself upwardly to provide for expansion, thus reducing the danger of breakage. To provide room for upward expansion where this can be done without impairing the pumping action, I form air cells or chambers at the top of each closed compartment, for example at the top of the suction chamber and of the discharge chamber, this being done by providing a downwardly projecting part around the outlet from each chamber, either as a lip on the interior of the casting, or by adjusting the valve seat plug so that it will project below the top wall of the chamber enough to leave a slight air space. Such adjustment is shown in the drawings, and each of these chambers is also shown as formed with a lip $z^5$ designed to hold a small quantity of air in the top of the chamber against which the ice can expand if formed. This provision is not made within the cylinder chambers, since there is rarely danger of these being injured by freezing, and confined air would by its reëxpansion impair the suction.

It will be understood that my invention is not limited to the particular details of construction, arrangement or adaptation set forth as constituting its preferred form, since it can be modified or utilized in whole or in part as circumstances or the judgment of those skilled in the art may dictate, without departing from the spirit of the invention.

The top wall of the cross-head M' is slitted at $w'$ so that it can be spread by a screw Z' screwing through the wall $v'$ and against the wall $u'$ if this is necessary to avoid lost motion.

Upward adjusting screws $y^4$ for the motor are provided, which are shown as screwed through holes $z^4$ in the body so that they bear against the insulation beneath the carrier Y'.

What I claim is:—

1. A pump casing having suction and discharge chambers, an intermediate cylinder chamber, a transverse wall subdividing said cylinder chamber near its center, and walls above and below said cylinder chamber having valved apertures communicating between the latter and said suction and discharge chambers at each side of said transverse wall, and having an internally screwthreaded portion, a bushing having an external screwthread screwing into said portion, a cylinder lining having free ends and carried by said bushing and passing through said transverse wall, and a piston working in said lining.

2. A pump casing having suction and discharge chambers, and an intermediate cylinder chamber divided intermediate of its ends by a transverse wall and separated from said suction and discharge chambers by walls having valved apertures communicating with the ends of said cylinder chamber, and closed at its front and rear ends by front and rear walls, all said walls being in one integral casting, said casting having identical holes bored through one end wall and transverse wall of said cylinder chamber, and each internally screwthreaded, a cylinder lining having a screwthreaded portion adapted to screw through the threaded hole in the end wall and screw into the threaded hole in the transverse wall, a plug for screwing into said hole in said end wall to close the latter, and a piston working in said cylinder.

3. A pump casing having suction and discharge chambers, and an intermediate cylinder chamber divided intermediate of its ends by a transverse wall and separated from said suction and discharge chambers by walls having valved apertures communicating with the ends of said cylinder chamber, and closed at its front and rear ends by front and rear walls, all said walls being in one integral casting, said casting having identical holes bored through said end walls and said transverse wall, each of said holes being internally screwthreaded, a cylinder lining having an external screwthread screwing through said hole in one end wall and screwing into said hole in said transverse wall, an imperforate plug screwing into and closing the hole in one of said end walls, and a perforate plug screwing into the hole in the other of said end walls, and a piston working in said lining and having a piston rod passing through the hole in said perforate plug.

4. A pump casing having suction and discharge chambers, an intermediate chamber subdivided by a transverse wall and separated from said suction and discharge chambers by walls having valved apertures communicating with its respective ends, and having front and rear walls and an integral portion in advance of said front wall, all formed in one integral casting, said casting having bored holes traversing said rear wall, said partition, said front wall and said projecting portion, a plug closing said rear wall, a piston working through the hole in said partition, a perforate plug closing said front wall, a piston rod for said piston extending through said plug, a slide on said piston rod working in the bore in said projecting portion, and means for moving said slide.

5. A pump casing having suction and discharge chambers, an intermediate chamber subdivided by a transverse wall and separated from said suction and discharge chambers by walls having valved apertures communicating with its respective ends, and having front and rear walls and an integral portion in advance of said front wall, all formed in one integral casting, said casting having bored holes traversing said rear wall, said partition, said front wall and said projecting portion, a plug closing said rear wall, a piston working through the hole in said partition, a perforate plug closing said front wall, a piston rod for said piston extending through said plug, a slide on said piston rod working in the bore in said projecting portion, and means for moving said slide, said casting having an integral drain-pan between said front wall and said projecting portion.

6. A pump casing comprising a cylinder chamber, and suction and discharge chambers having valved apertures communicating with said cylinder chamber, said suction and discharge chambers having upwardly and outwardly tapering side walls.

7. A pump having suction and discharge chambers, a cylinder, and a passage communicating between said suction and discharge chambers, a piston in said cylinder, valves controlling communication between said suction chamber and said cylinder and between said cylinder and said discharge chamber, and a pressure-operated valve controlling communication from said discharge chamber to said suction chamber, and adjusted to open at a predetermined limit of pressure in the former, an adjustable spring for holding said pressure-operated valve to its seat, and an adjustable stem for the latter valve against which stem said spring reacts.

8. A body having a gear chamber for pump driving mechanism, a drain chamber, an intervening wall formed with a slideway communicating between said chambers, a pump carried on said body adjacent to said drain chamber, a source of power carried by said body adjacent to said gear chamber, driving mechanism in said gear chamber and connected to said source of power, a reciprocating slide in said slideway and connected to said driving mechanism, and a piston in said pump operated by said slide.

9. A body consisting of an integral casting having a pump chamber and a drain chamber on one end, an integral partition intermediate of its ends and in front of said drain chamber, and a gear compartment in front of said pump chamber, said compartment and chamber both formed in one integral piece, in combination with a cylinder and piston in said pump cylinder, driving mechanism in said gear compartment, and a connection between said piston and said mechanism crossing said partition.

10. A body having a gear compartment and a drain compartment, and an intervening wall, and adapted to carry a pump at its end adjacent to said drain compartment and to carry a motor at its other end, in combination with driving mechanism in said gear compartment, and a connection for transmitting motion from said mechanism to the pump traversing said partition.

11. A body having a drain compartment at one end and there adapted to carry a pump, and having a gear compartment beyond said drain compartment, and a slideway between said compartments, and having a projection at its end adjacent to said gear compartment for carrying a motor, in combination with driving mechanism in said gear compartment, means for connecting such mechanism to a motor, a slide worked by said mechanism and working in said slideway, and means for connecting said slide to a pump.

12. A body having a chamber open at top, and having an integral portion intermediate of the ends of said chamber provided with a slideway, said body adapted to carry a pump at the end of said chamber adjacent to said slideway and to carry a motor at the other end of said chamber, driving mechanism in said chamber, means for connecting such mechanism to a motor, and a slide in said slideway operated by said mechanism, and means for connecting such slide to a pump.

13. A body having a compartment open at top, having side walls formed with transverse bearings for a crank shaft, and having transverse walls provided with longitudinal bearings for a driving shaft, and having an integral portion beyond one end of said compartment for carrying a motor, and carrying a pump at the other end of said compartment, said body having an integral internal portion between its end carrying said pump and said crank shaft bearings provided with a slideway, a worm gear having a shaft mounted in said crank shaft bearings, a worm driving said gear having a shaft mounted in said driving shaft bearings, a motor carried by said body and connected to said worm shaft, a slide carried by said slideway, eccentric cranks driven by said worm gear and operating said slide, and a piston connected to said slide.

14. A body having a pump at one end, a motor at its other end, and having an intermediate compartment for containing driving mechanism, said body formed with an aperture for a crank shaft bearing in one of its side walls, and having an aperture for an auxiliary shaft bearing between said bearing and its pump end, and provided with a slideway within said compartment adjacent to said pump end, and having a longitudinal bearing for a driving shaft above said shaft bearings.

15. A body having a pump at one end, a motor at its other end, and having intermediate of its ends and isolated from said motor a compartment spaced apart from its pump end for containing driving mechanism, said body formed with an aperture for a crank shaft bearing in one of its exterior side walls, and having an integral part having a transverse aperture for an auxiliary shaft bearing above and between said side walls and intermediate thereof, and a longitudinal bearing above the latter bearing.

16. A body A carrying a pump at one end and a motor at the other end, and having an intermediate box D provided with portions $b'$ and $f'$ projecting above its side walls and carrying longitudinal bearings, an internal portion provided with slideways, vertical walls $c'$ provided with transverse bearings and transverse holes $g'$ in its side walls, in combination with a worm shaft carried in bearings in said projecting portions, right hand and left hand worms carried by said worm shaft, a pump carried at one end of said body, an auxiliary worm gear fitting the bearings in said walls $c$ and meshing with one of said worms, a larger worm gear having crank provisions and meshing with the other of said worms and with said auxiliary gear, a crank shaft for said larger worm gear carried in bearings coincident with said holes $g'$, longitudinally adjustable bearings for said worm shaft, and a motor connected to said worm shaft.

17. A body carrying a pump cylinder, and having a gear compartment spaced apart from and isolated from said cylinder, and having intervening walls at adjacent sides of said cylinder and compartment, in combination with a piston working in said cylinder, driving mechanism in said compartment, and means for communicating motion from said mechanism to said piston.

18. A body carrying a pump cylinder, and having a gear compartment spaced apart from said cylinder, and having integral walls and an intervening passage between the adjacent sides of said cylinder and compartment, in combination with a piston in said cylinder, driving mechanism in said compartment, and a connection between said piston and said mechanism for communicating motion from the former to the latter.

19. A body carrying a pump cylinder, and having a gear compartment spaced apart from said cylinder, and having a chamber and a slideway between said cylinder and compartment, in combination with driving mechanism in said compartment, a slide working on said slide-way, and means for communicating motion from said mechanism to said slide.

20. The combination with a body having a gear compartment and having a transverse and a longitudinal bearing, of a crank shaft in said transverse bearing, a worm gear having crank provisions and mounted on said shaft, a worm shaft above said compartment and carried in said longitudinal bearing, a worm carried by said worm shaft and meshing with said gear, and a relatively long worm adjustably mounted on said worm shaft.

In witness whereof, I have hereunto signed my name in the presence of two subscribing witnesses.

GEORGE H. FRASER.

Witnesses:
   DOMINGO A. USINA,
   FRED WHITE.